US006182276B1

(12) United States Patent
Brawn et al.

(10) Patent No.: US 6,182,276 B1
(45) Date of Patent: Jan. 30, 2001

(54) HOST APPLICATION PRESENTATION SPACE RECOGNITION PRODUCING ASYNCHRONOUS EVENTS

(75) Inventors: Thomas J. Brawn, Apex; David Blair Gilgen, Raleigh; Mark Anthony McMillan, Raleigh; Brian Thomas Webb, Raleigh, all of NC (US)

(73) Assignee: International Business Machines Corporation, Armonk, NY (US)

( * ) Notice: Under 35 U.S.C. 154(b), the term of this patent shall be extended for 0 days.

(21) Appl. No.: 09/034,297

(22) Filed: Mar. 4, 1998

(51) Int. Cl.[7] .................................................. G06F 9/45
(52) U.S. Cl. ................................................................ 717/1
(58) Field of Search ..................................................... 717/1

(56) References Cited

U.S. PATENT DOCUMENTS

| 5,862,341 | * | 1/1999 | Hsia | 395/200.58 |
| 5,961,592 | * | 10/1999 | Hsia | 709/217 |
| 5,968,119 | * | 10/1999 | Stedman et al. | 709/219 |
| 6,049,832 | * | 4/2000 | Brim et al. | 709/237 |
| 6,052,685 | * | 4/2000 | Eastwick et al. | 707/10 |

OTHER PUBLICATIONS

Sherrington. How to migrate legacy system from mainframe to open system technology, Dec. 1994. pp. 1–3.*
Neumann. Evolution process for legacy system transformation. 1994. pp. 57–62.*

* cited by examiner

Primary Examiner—Tariq R. Hafiz
Assistant Examiner—Wei Zhen
(74) Attorney, Agent, or Firm—Jeanine S. Ray-Yarletts; Marcia L. Doubet (57) ABSTRACT

A technique, system, and computer program for enabling workstation software applications to efficiently and reliably use legacy host application data streams, without requiring change to the host applications. This is achieved by defining attributes of presentation spaces (screens or parts of screens) that are of interest to the workstation application, defining target objects to process the legacy host data, registering these attribute definitions and corresponding target objects with a screen recognition object, using the screen recognition object to monitor the host data streams for occurrence of a registered screen, and generating an asynchronous event to invoke the target object when a registered screen is detected. The efficiency is obtained because the workstation application programmer no longer has to write code to monitor the host data streams for the screens of interest. The reliability is obtained because the application programmer now reliably knows when a screen of interest appears in the host data stream.

15 Claims, 5 Drawing Sheets

HOST APPLICATION PRESENTATION SPACE RECOGNITION PRODUCING ASYNCHRONOUS EVENTS

BACKGROUND OF THE INVENTION

1. Field of the Invention

The present invention relates to a computer system, and deals more particularly with a method and apparatus for operating such a computer system attached to a host data stream, such that the computer system can automatically recognize the presence of a host application presentation space in the data stream coming from the host application. Using the present invention, the programmer defines attributes of a presentation space he is interested in, then registers that presentation space definition. The present invention monitors the data stream, and generates an asynchronous notification if that presentation space appears in the host data stream. This notification automatically invokes software to process the presentation space information.

2. Description of the Related Art

One of the challenges facing information services ("IS") professionals today is the difficulty of bridging legacy mainframe host data to modern PC-based user interfaces. Most legacy host applications present their data in text-based user interfaces designed for use on specific, obsolete character-based terminals. The legacy applications were written with this character-based terminal presentation space as the only interface format in which the host data output is created, and in which host data input is expected. "Presentation space" is a term used abstractly to refer to the collection of information that together comprises the information to be displayed on a screen, as well as the control data that conveys how and where that information is to represented.

A typical character-based terminal is the IBM Model 327X. (IBM is a registered trademark of the International Business Machines Corporation.) This terminal model was designed to display information in a matrix of characters, where the matrix consisted of 24 rows each having 80 columns. When programs were written expecting this display format, programmers would specify placement of information on the screen using specific row and column locations. Information formatted for this display is sent as a "data stream" to the mechanism in the display hardware that is responsible for actually displaying the screen contents. The phrase "data stream" refers to the fact that the data is sent as a linear string, or stream, of characters. This stream of characters contains both the actual textual information to be displayed on the screen, as well as information specifying where and how the text is to be displayed. "Where" consists of the row and column where the text is to begin, and "how" consists of a limited number of presentation attributes such as what color (typically either green or white) to use when displaying that text. While the Model 327X is a specific type of IBM display hardware, data formatted for any display having similar characteristics became a de facto standard format referred to as a "3270 data stream". Similarly, the IBM Model 525X. is another type of character-based terminal. This terminal displays data in a slightly different manner from the IBM 327X, and consequently uses a different data stream format. The "5250 data stream" also became a de facto standard format for displays having similar characteristics. A third type of data stream format commonly used by legacy host applications is referred to simply as an "ASCII data stream". While an ASCII data stream is not formatted for a specific model of display screen, a data stream in this format has certain predefined characteristics (for example, the manner in which a control character indicates the line spacing to be used).

The displays used with modern computer workstations (including personal computers, network computers, etc.) support graphics and video, in addition to text characters. These displays do not use a character-based row and column matrix approach to screen layout. Instead, the programmer has access to thousands of tiny display elements, allowing the various types of information to be placed virtually anywhere on the display screen.

When the modem computer workstation is used to access a legacy host application running on a mainframe, the output data created by that host application is typically still formatted as one of the character-based data streams. The workstation has access to the host application using mainframe emulator software. An example of mainframe emulator software is the Personal Communications product from IBM. Emulator software runs on the workstation. This software provides facilities to establish a telecommunications connection between the workstation and the host computer, to invoke execution of a software application stored on that host, and to transfer information between the host and the workstation as the application runs. When a legacy application is accessed using an emulator, it appears to the host as if the host was interacting with a so-called "dumb terminal", instead of an intelligent workstation. The emulator takes care of reformatting the character-based data sent by the host, for display on a modern display screen.

Currently, there is movement in the computer information industry away from using mainframe emulators as the primary user interface to the host applications. Therein lies the problem. When an emulator is no longer used, the emulator's complicated interface logic for translating between the character-based data stream and the modern workstation display screen layout must be performed by some other service running on the workstation.

One solution to this problem of obsolete data stream formats is to rewrite the host applications, so that they create their output in a format recognized by modern displays. For most companies, this rewrite of host applications represents a monumental task. Not only are there literally millions of lines of code to rewrite, the skills that are required to program host applications (ability to use the COBOL programming language, for example) are in short supply.

There is an alternative solution to rewriting the host applications, which many IS professionals have chosen. The user interface facilities of many modern application programs accept the existing host presentation space format when retrieving data from the host application, but do not show the data to the user in this format. The new user interface facilities "scrape" (that is, extract) data from the host presentation space, and present it to the user in a form that is appropriate for the display screen device used with the computer system. By convention, this form tends to be a graphical user interface where information is presented in a window-based layout. The user interacts with the application using this graphical user interface. When data needs to be returned to the application computer, for example in response to the user's input, the user interface facility converts this information automatically into a format that is recognized by the host application.

This solves the problem of having to rewrite the host application, but it presents a new problem. Presentation spaces appear asynchronously in the data stream sent from the host application, so using the presentation space format as the expected format for user interface data becomes unpredictable. Whether it is due to network traffic, host application response time, etc., there is no set time when a presentation space will begin arriving from the host application, and no specific period of time in which the entire screen contents will be transmitted. What is needed is a program that automates host presentation space interaction. This program should constantly monitor the data stream coming from the host to see if a particular presentation space appears. When the presentation space does appear, this program should asynchronously notify a software routine that embodies knowledge of how the presentation space is formatted, and how the information contained in that presentation space is to be presented to the user.

SUMMARY OF THE INVENTION

An object of the present invention is to provide a technique whereby modem user interface facilities are able to efficiently and reliably retrieve legacy host application data from a data stream that is formatted as a host presentation space.

Another object of the present invention is to provide a technique whereby these modem user interface facilities can retrieve the legacy host application data without rewriting the host application.

A further object of the present invention is to provide a technique whereby the retrieved application data is made available to a software routine that reformats it for presentation using a modem, non-character based user interface display device.

Additionally, it is an object of the present invention to provide a technique whereby the programmer can register a set of attributes that will be used by a screen recognition object to automatically recognize the presence of a presentation space in the data stream, and a target object to process the recognized presentation space.

A further object of the present invention is to provide a technique for asynchronously monitoring the data stream, and asynchronously generating a notification to the target object when a specific presentation space appears. By allowing these processes to operate asynchronously, the workstation software can proceed on to other tasks without having to suspend processing to wait for appearance of a presentation space.

An embodiment of the present invention will use definitions of presentation spaces (that is, screens or portions thereof) that may appear in a host application data stream, registering those definitions with a presentation space recognition object. This registration includes identifying one or more data streams to be monitored, each relevant presentation space definition, and a target object to be asynchronously notified if the presentation space appears. The target object contains the logic to process the presentation space: it understands the data stream format used, and knows what to do with the elements it contains. For example, the target object will typically scrape the data from the presentation space, and reformat it for display. Additionally, the preferred embodiment will contain logic to unregister a presentation space, which causes the registration object to stop monitoring the data stream for that screen.

This invention may be used with any data stream format that has a well-defined format, and well-defined codes indicating the attribute types used in the data stream.

By using this asynchronous notification technique, programs executing on a modem workstation will have an efficient, reliable way in which to receive and process presentation spaces from legacy host applications that are formatted for obsolete character-based terminals. The technique is efficient because the programmer no longer has to include code in workstation-based programs to monitor host data streams for presentation spaces. The technique is reliable because the workstation-based program now reliably knows, by way of the asynchronous event notification, when a presentation space of interest has arrived.

Other objects and advantages of the present invention will be set forth in part in the description and in the drawings which follow and, in part, will be obvious from the description or may be learned by practice of the invention.

The present invention will now be described with reference to the following drawings, in which like reference numbers denote the same element throughout.

DESCRIPTION OF THE PREFERRED EMBODIMENT

Figure 1:
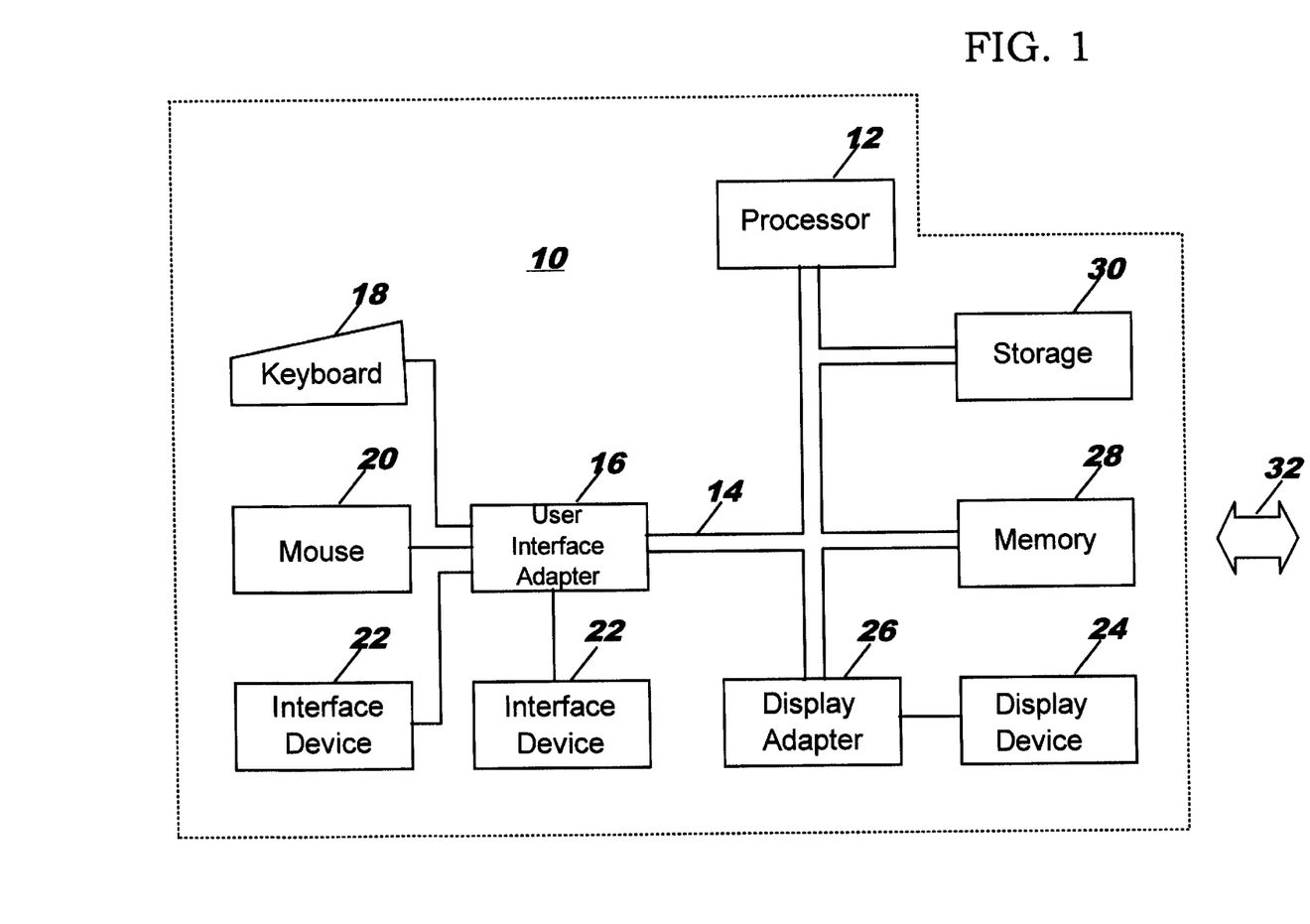
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate via a communications channel 32 with other computers or networks of computers. The workstation 10 may be associated with such other computers in a local area network (LAN) or a wide area network, the workstation 10 can be a client in a client/server arrangement with another computer, etc. All of these configurations, as well as the appropriate communications hardware and software, are known in the art.

Figure 2:
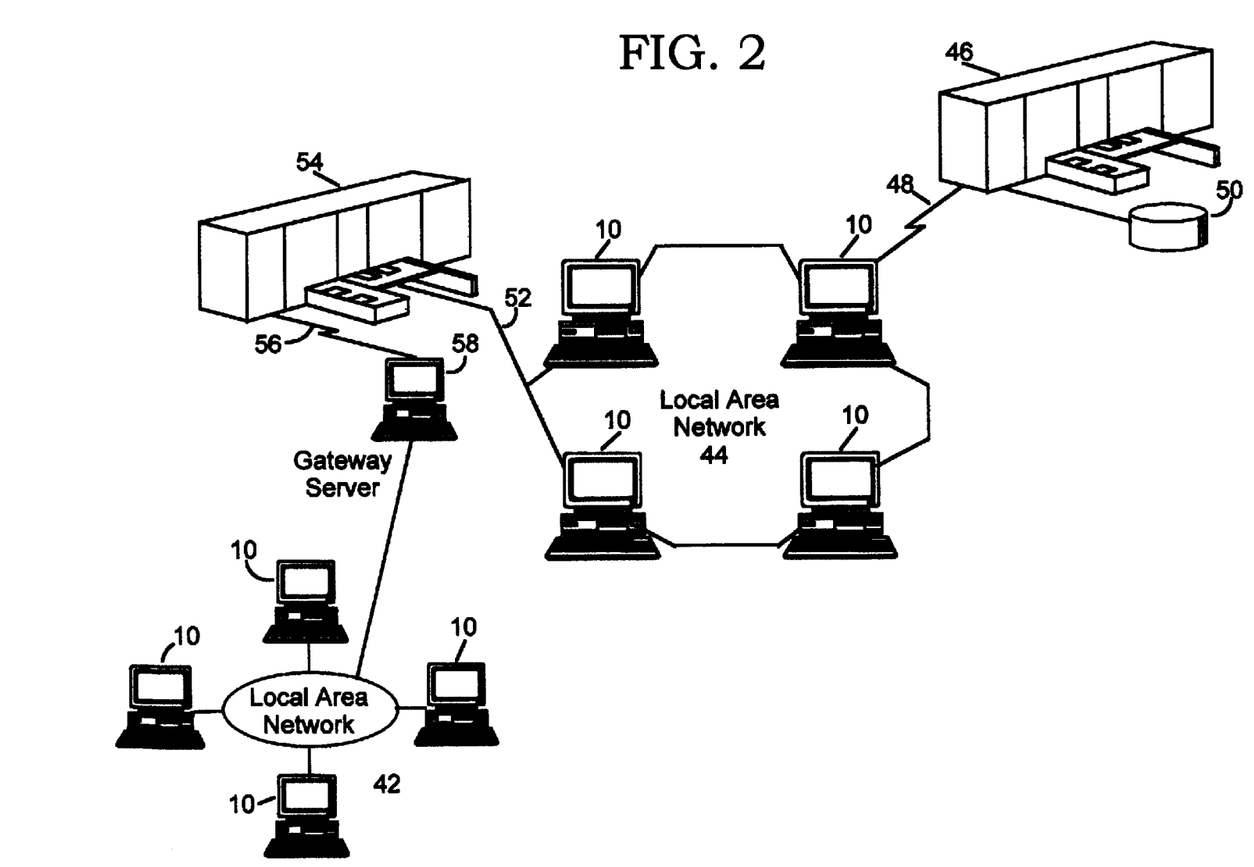
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include mainframe computers or servers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from IBM. Depending on the application, a mid-range computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/ communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The reformatted data resulting from use of the present invention may be displayed on any of the various display devices 24. The user interacts with the data using any type of interface device such as a keyboard 18, mouse 20, and/or other interface devices 22 (such as a touch sensitive screen, digitized entry pad, etc.).

The preferred embodiment of the present invention will now be discussed with reference to FIGS. 3 through 5.

In the preferred embodiment, the present invention is implemented as a computer software program. The implementation of the invention may be used with any software application that displays data using a non-character-based user interface, such as a graphical user interface, but which interacts with a host application that uses a character-based display format. The application may execute entirely on the user's computer, as a stand-alone software package, or it may execute partly on the user's computer and partly on a remote computer, such as a middle-tier server. In the latter scenario, the remote computer may be connected to the user's computer through a LAN or a WAN that is part of a network owned or managed internally to the user's company, or the connection may be made through the Internet using an Internet Service Provider.

The present invention allows the programmer to register presentation space definitions for monitoring by a screen recognition object, to specify which data stream(s) should be monitored for the presence of the registered presentation spaces, and to specify the software routine (referred to herein as the "target") to receive a notification when a registered presentation space appears in the data stream. The present invention then monitors the data streams(s) asynchronously, and generates an asynchronous notification to the appropriate target software routine when a registered presentation space is detected in the data stream. The notified target routine then processes the presentation space. Further, the present invention includes features by which the programmer can indicate that monitoring for a specific presentation space should cease.

In the preferred embodiment, the invention will be implemented using object-oriented programming languages and techniques. However, the invention can be implemented using conventional programming languages that are not object-oriented, without deviating from the inventive concepts. Use of the term "object" herein is not to be construed as limiting the invention to object-oriented techniques.

The preferred embodiment is described using references to a 3270 data stream. However, the inventive concepts of the present invention are not limited to 3270 data stream formats: any data stream format may be equivalently used, as previously discussed.

Figure 3:
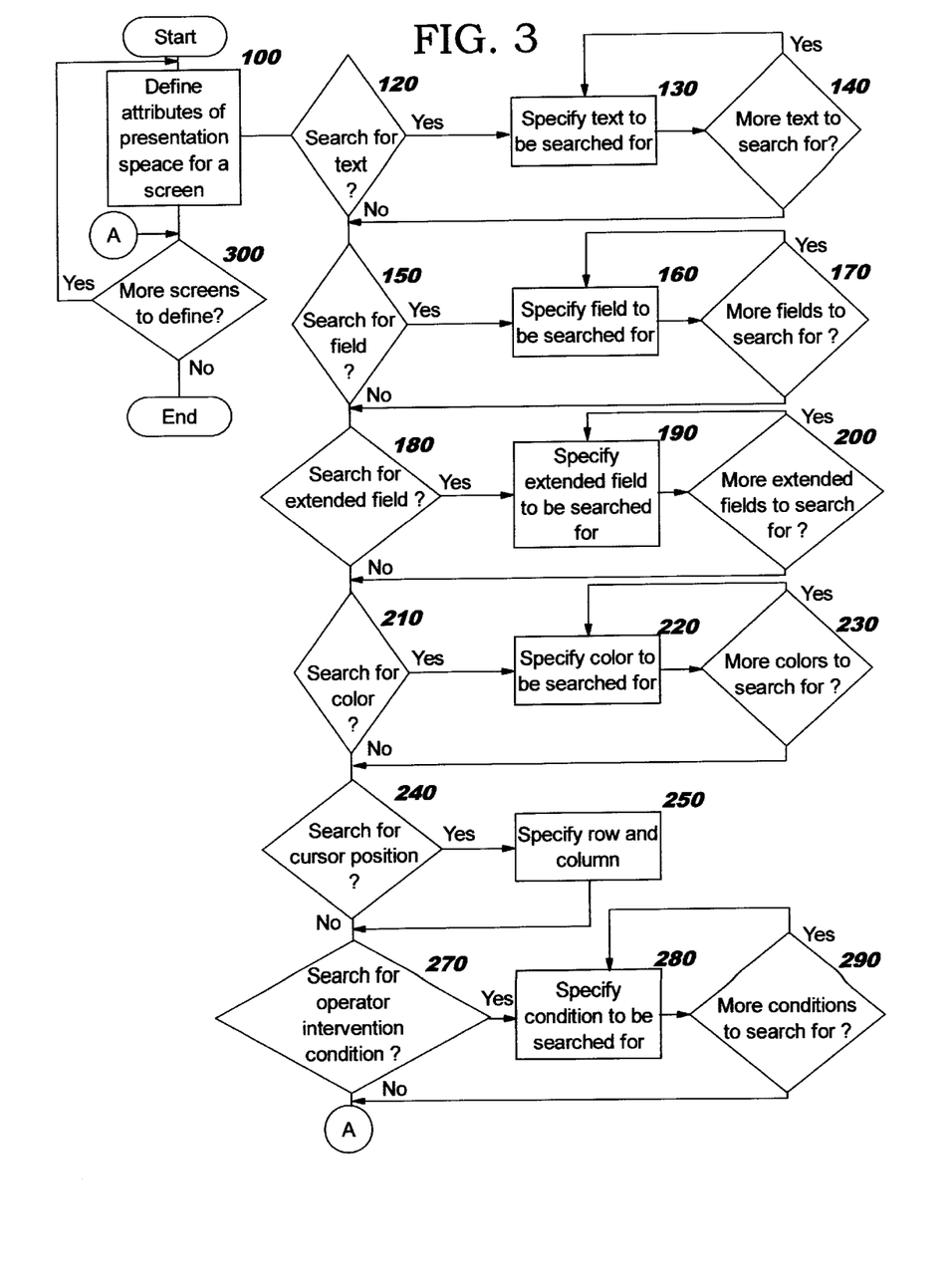
FIG. 3 illustrates a flow chart which sets forth the logic involved when the programmer defines the attributes of a presentation space (or some portion thereof) that will enable automatic recognition of that presentation space by an embodiment of the present invention.

FIG. 3 illustrates the logical steps that may be performed by a programmer to define the attributes of a presentation space that will enable automatic recognition of that presentation space by a screen recognition object in an embodiment of the present invention. The specific technique of defining the attributes does not form part of the present invention. A number of ways of specifying attributes could be used. For example, a programmer could include programming language statements in a workstation application that uses the present invention, where those programming language statements would specify attributes for each screen of interest. These programming language statements would then become part of the executable workstation application. Alternatively, a software routine could be written which prompts the programmer to specify attributes of each screen of interest. That software routine would then record the programmer's entries, for example by storing them in a file on a medium such as a disk. This prompting software could be part of the workstation application, or it could be a stand-alone program. What is required for the present invention is that the screen attributes are somehow defined, and made available in a format expected by the recognition object. (As the particular details of the data stream format change, the recognition logic may need to be changed accordingly. Details of how a screen is recognized by the screen recognition object do not form part of the present invention.) The steps shown in FIG. 3 would apply equally to the process a programmer goes through when writing programming language statements, and to the process that would be implemented in a software prompting technique. The steps will be described as if implemented in the latter form.

The process begins at Step 100, where the programmer begins defining the attributes of a specific screen. When the data stream being used with the present invention is a 3270 data stream, six different types of attributes may be used to define a screen. While the preferred embodiment will be described with reference to these specific attribute types, the inventive concepts of the present invention apply equally to presentation spaces that use additional or different attributes. What is required is that the attribute types used in the data stream, as well as their possible values, are known by the programmer so that he can specify the definition of the presentation spaces in which he is interested in terms of those attributes.

Step 100 indicates that the programmer will define attributes of the presentation space for a "screen". Alternatively, the attributes may represent some portion of a screen. The logic of FIG. 3 applies equally to defining the attributes of a full screen or a partial screen, and thus the term "screen" will be used hereinafter to represent either situation.

The programmer will be required to assign some type of identifier to the collection of attributes that have been used to define a particular screen. This identifier can be specified at any time during the attribute definition process for a screen. According to the preferred embodiment, that information will be specified at Step 100. This identifier will typically be the screen name. It will be used in the processes represented by FIGS. 4 and 5.

At Step 120, the programmer begins a process of specifying which attributes are of interest for this particular screen. The inquiries shown at Steps 120, 150, 180, 210, 240, and 270 represent the six attribute types of a presentation space recognized by the preferred embodiment. As discussed earlier, the inventive concepts of the present invention will apply equally well if additional attribute types, or different attribute types, are used. It will be obvious to one skilled in the art how the logic shown in FIG. 3 can be extended to include more attribute types, or changed to use different attribute types.

At Step 120, the programmer is asked if he wishes to specify one of the types of attribute, shown here as the "text" attribute. If the answer is positive, then at Step 130 the programmer specifies the text string of interest. When screen recognition logic in the screen recognition object is later attempting to recognize a text string in the host application data stream, it will typically perform a pattern-matching operation with the text string the programmer entered as an attribute, comparing the data that appears in the data stream against the characters in the text string. The programmer may indicate additional information about the text string, such as whether the pattern-matching operation should treat the text string as case-sensitive. Additionally, the programmer may specify that a certain row and column position is the only starting position of interest for this text string. When the text string and any of these additional descriptors has been specified, Step 140 asks if there are more text strings to be used as attributes for this screen. As an example, the programmer might specify text that appears as a screen heading as one text attribute. If the screen has a sub-heading, the text of the sub-heading could be specified as a second text attribute. If there are more text strings to be specified, control returns to Step 130.

Control reaches Step 150 when the programmer has finished specifying text string attributes, or when the programmer indicated (at Step 120) that he did not wish to specify any text attributes. At Step 150, the programmer is asked if he wants to specify attributes of the second type, shown here as "fields" attributes. If the answer is positive, then at Step 160 the programmer specifies information that will allow the field of interest to be later recognized by screen recognition logic. For example, in the 3270 data stream, a field can be designated as "display only" by using a certain hexadecimal value as a field attribute. The programmer may specify this hexadecimal value as a field attribute if he wishes the screen recognition object to detect such a field. When the field has been specified, Step 170 asks if there are more field attributes to be defined for this screen. If there are more field attributes to be specified, control returns to Step 160.

Control reaches Step 180 when the programmer has finished specifying field attributes, or when the programmer indicated (at Step 150) that he did not wish to specify any field attributes. At Step 180, the programmer is asked if he wants to specify attributes of the third type, shown here as "extended fields" attributes. In the 3270 data stream, extended field attributes are indicators of such things as reverse video, highlighting, etc. If the answer is positive, then at Step 190 the programmer specifies the extended field of interest. When the extended field has been specified, Step 200 asks if there are more extended field attributes to be defined for this screen. If there are more extended fields to be specified, control returns to Step 190.

Control reaches Step 210 when the programmer has finished specifying extended field attributes, or when the programmer indicated (at Step 180) that he did not wish to specify any extended field attributes. At Step 210, the programmer is asked if he wants to specify attributes of the fourth type, shown here as "colors" attributes. If the answer is positive, then at Step 220 the programmer specifies the color of interest. The programmer will also specify which row and column the color must be associated with, in order for a successful match against the data stream when screen recognition logic is later attempting to match this screen definition against a presentation space occurring in the host application data stream. When the color attribute has been specified, Step 230 asks if there are more colors to be used as attributes for this screen. As an example, the programmer might specify the color red to be used as an attribute. Then he might specify the color yellow as a second color attribute, so that screens containing both red and yellow at specific locations could be detected. If there are more colors attributes to be specified, control returns to Step 220.

Control reaches Step 240 when the programmer has finished specifying color attributes, or when the programmer indicated (at Step 210) that he did not wish to specify any color attributes. At Step 240, the programmer is asked if he wants to specify attributes of the fifth type, shown here as a "cursor position" attribute. This attribute type is used when the programmer wants to detect when the cursor is positioned at a specific row and column. If the answer is positive, then at Step 250 the row and column of interest are specified. (Since the cursor can only be at one row and column on a screen, the programmer is not entering multiple cursor position attributes. However, an alternative embodiment might allow the programmer to indicate that the presence of the cursor at any number of alternative positions should be detected. In that situation, a test would be added after Step 250, asking whether there are more positions of interest, and transferring back to Step 250 to allow entry of each position if the response is positive.) When the cursor position information has been specified, control transfers to Step 270.

Control reaches Step 270 when the programmer has finished specifying the cursor position attribute, or when the programmer indicated (at Step 240) that he did not wish to specify a cursor position. At Step 270, the programmer is asked if he wants to specify attributes of the final type used for the preferred embodiment, shown here as "operator intervention condition" attributes. If the answer is positive, then at Step 280 the programmer specifies the condition of interest. An operator intervention condition, as defined in the 3270 data stream, is a hexadecimal code appearing in the data stream that indicates such things as "input inhibited". When the condition attribute has been specified, Step 290 asks if there are more conditions to be defined as attributes for this screen. If there are more conditions to be specified, control returns to Step 280.

While the above descriptions discuss multiple attributes of one type being used in conjunction (as in an "AND" operation) to specify screen requirements, alternatively these attributes may be used disjunctively (as in an "OR" operation) to indicate that a screen matches the definition when it has any of the attributes. Additional steps may be added to the process shown in FIG. 3, to enable the programmer to specify whether AND or OR is desired when multiple attributes are being defined. It will be obvious to one of ordinary skill in the art how to add such additional steps to FIG. 3.

When the programmer has finished specifying attributes that will define the screen of interest, control transfers to Step 300.

At Step 300, the programmer is asked whether he wishes to define the attributes of more screens. If so, then control transfers to Step 100, to begin the definition process for another screen. Otherwise, the definition process ends.

Figure 4:
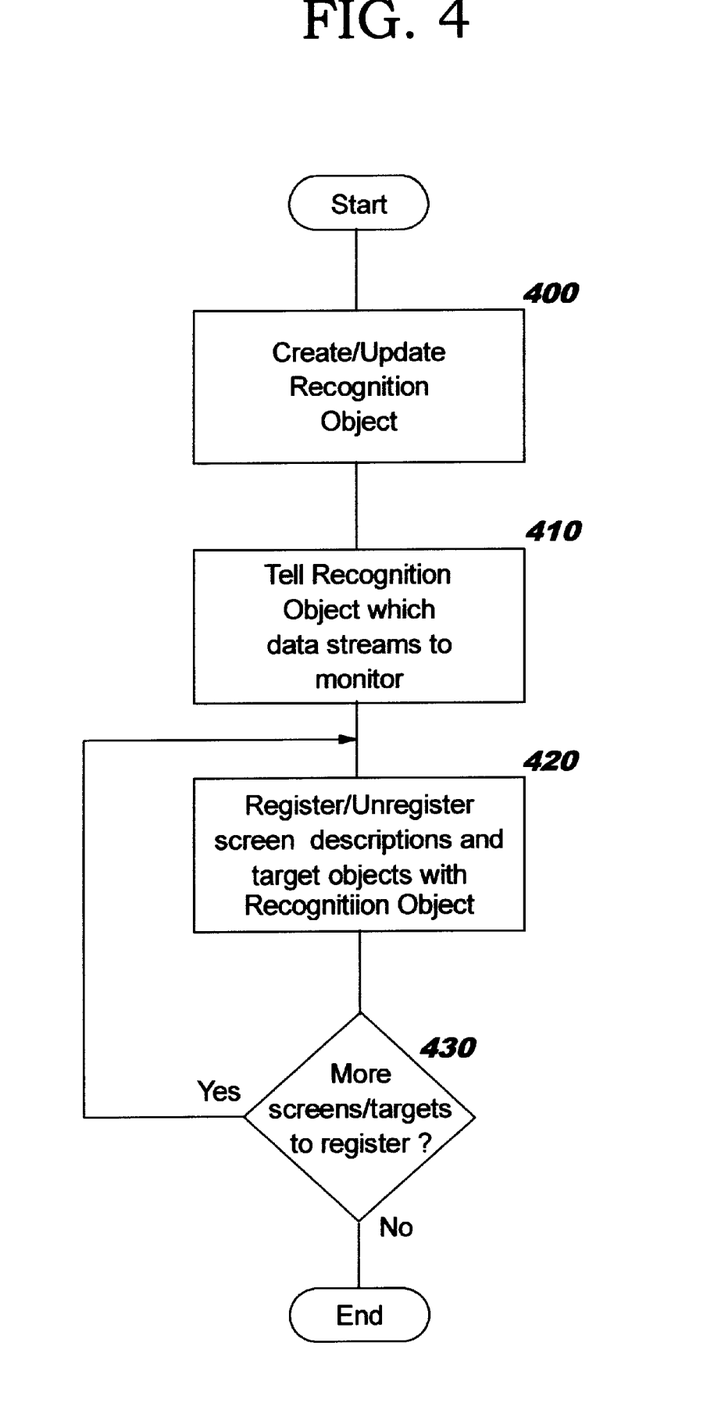
FIG. 4 illustrates a flow chart which sets forth the logic involved when registering screen definitions and associated target objects with the screen recognition object.

FIG. 4 illustrates the logic involved in configuring an embodiment of the present invention to monitor one or more specific data streams for the occurrence of the screens having the attributes that were defined using a process such as shown in FIG. 3. This configuration process is referred to herein as "registration"—that is, the screen definitions to be detected, the target object to process each detected screen, and the data streams to be monitored, are registered with the screen recognition object. This design for the screen recognition object enables it to function as a generic monitor, which can monitor for anything registered to it: it is not limited to a predefined, hardcoded set of screen definitions. This effectively separates the screen recognition process from the data contained in the screens.

Step 400 indicates that a screen recognition object will either be created or updated. In the preferred embodiment, the screen recognition object is created when the workstation application begins execution, and therefore the object persists only for the duration of the application. The present invention contemplates that an initial set of screen definitions may be registered with the screen recognition object at the time of its creation. Further on during the execution of the host and workstation applications, additional screen definitions may be registered. The initially-registered definitions would typically be for the screens expected when a host application is beginning, and later-registered definitions would be for screens expected later on during the interaction. Depending on the particular host application, however, it may be desirable to register the entire set of screen definitions at one time. The present invention includes either approach, where all screen definitions may be registered initially, or some may be registered initially and others registered later. Thus, FIG. 4 refers to both creating the recognition object, and updating it. The term "recognition object" is used to indicate the software that (1) contains screen recognition logic that processes the attribute definitions created previously, (2) monitors the host application data streams of interest for registered screens, and (3) notifies the "target object" (described below) when a registered presentation space appears in a monitored host data stream. This software may be an object, in an object-oriented programming environment, or it may be a routine or module implemented in a non-object-oriented programming language.

At Step 410, the programmer specifies which particular data streams should be monitored by this recognition object. The particular manner in which a data stream is identified to the recognition object, and in which the recognition object locates the appropriate data stream at execution time, do not form part of the present invention. Such techniques are known by those of ordinary skill in the art. A programmer writing a workstation application that interacts with a host application will specify, in his workstation application, a session to be used for communications between the two applications. The present invention then uses an identifier for that already-created session (for example, a pointer returned from a function call that created the session) in the registration process at Step 410.

At Step 420, the programmer specifies the information to be registered for a particular screen. The information for each screen comprises the identifier used to name the collection of attributes that enable recognition of this screen (as was described above in reference to FIG. 3), and the target object associated with this screen. A target object is an object (when using object-oriented programming), or a code routine or module (when using non-object-oriented programming), that contains code to process a particular legacy host screen. This processing typically will include scraping the data stream for this screen, to extract relevant data. The scraped data will then typically be reformatted for presentation with a modem user interface such as a windowing environment. However, the specific details of the logic included in the target object will be application-specific, as defined by the programmer of the workstation-based application, and do not form a part of the present invention. (For example, some parts of the legacy information may not be displayed in the new presentation format; some parts may be displayed in different areas of the new screen; etc.) What is required for the present invention is that an executable target object is defined, and that it is identified to the registration object at this step so that it can be invoked by an asynchronous event (using the process described for FIG. 5).

The preferred embodiment allows the programmer to "unregister" a screen and its target object as well. As an example of how the registration and unregistration processes occur, the registration process may create a table of entries in a disk file, containing the associations of screens and their target objects. The unregistration process would then delete a specified entry from this table. The table entries would be used by the monitoring process described in FIG. 5. Alternatively, the screen and target associations may be treated as dynamic information, which does not persist beyond the execution of the code embodying the monitoring process. In that situation, the associations would be stored internally, within the memory or disk space allocated to the executing program. Unregistration would typically occur at some point later in execution from the point where registration occurred, and would involve removing the association from that memory or allocated disk space.

At Step 420, a test is made as to whether there are more screen definition and target object associations to register.

Any number of such associations can be registered in the preferred embodiment. If the test has a positive response, then control returns to Step 420. Otherwise the registration process is complete, and the process shown in FIG. 4 ends.

As with FIG. 3, multiple ways of indicating the information required for the registration process of FIG. 4 may be used. Programming language statements may be included in a workstation-based application that will create or update a recognition object, and register screen and target information with it. In this situation, the target may be an object (or a subroutine in a conventional programming language) within the application, or it may be a standalone executable program. Or, the registration process may operate using a programmer prompting technique such as that discussed for FIG. 3. If prompting is used for the registration process, the prompting code logic may or may not be embodied in the same code that implements the definition process of FIG. 3. The logic represented in FIG. 4 applies to both the programming statement and the prompting approach to registration.

Figure 5:
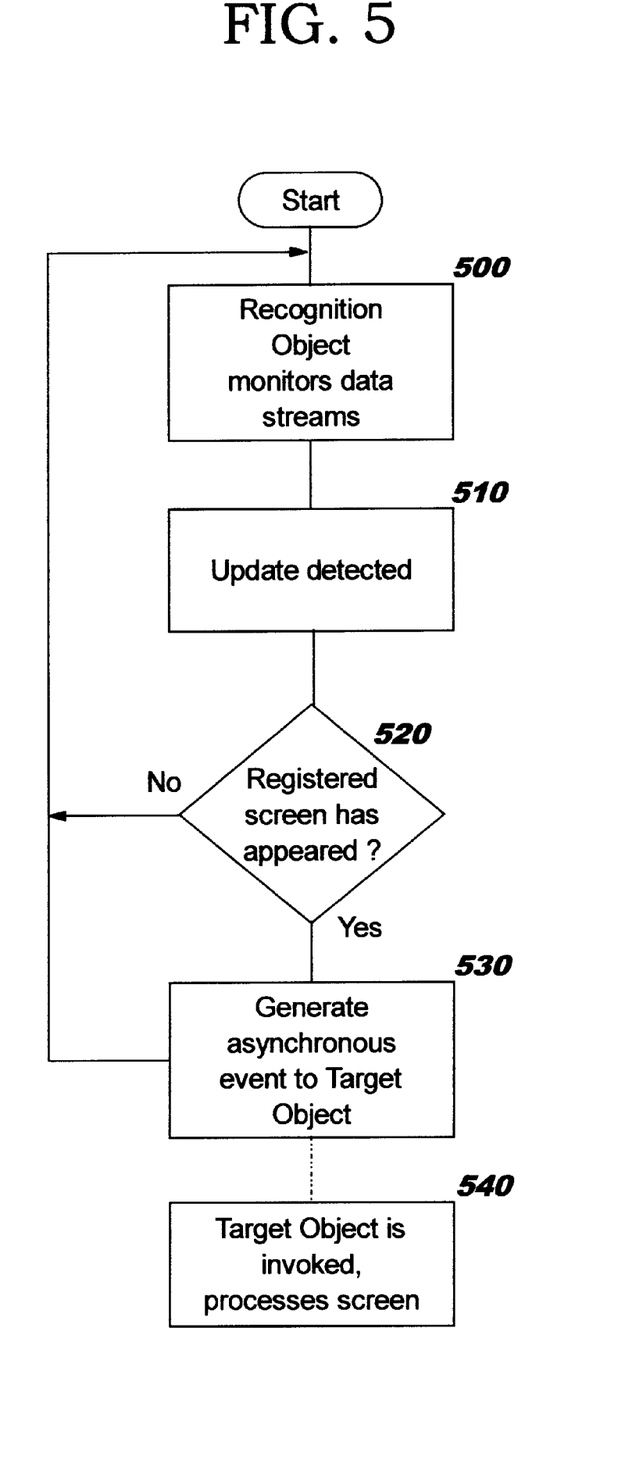
FIG. 5 illustrates a flow chart which sets forth the logic involved with the present invention when a recognized presentation space is detected in a data stream.

FIG. 5 describes the preferred embodiment of the present invention in operation (that is, after the definition and registration processes have been completed), monitoring data streams for the appearance of registered screens.

Step 500 indicates that the monitoring process begins. The recognition object, with which screen definitions were registered in FIG. 4, receives the data in the data streams it has been configured to monitor. In absence of the present invention, these data streams would be processed directly by a workstation application, which application would be required to include data stream monitoring logic. With the present invention in place, the data streams are processed by the screen recognition object. This recognition object monitors all data arriving in the data stream from the host application.

Control transfers to Step 510 when an update to the data stream coming from the host application is detected. The manner of detecting this update does not form part of the present invention. Facilities for detecting updates are known by those of ordinary skill in the art. A programmer writing a workstation application that interacts with a host application will either write code to check for updates coming from the host, or use prewritten code from a code library that is designed to detect such updates. The present invention takes advantage of that existing code, and receives the update notification.

As shown in Step 520, the screen recognition object then compares the data in the data stream to the definition of the registered screens, to determine if a screen of interest has appeared. This comparison uses the sets of attributes that were defined according to FIG. 3, enabling a particular screen to be recognized. For example, if the registered definition for a screen includes just one text string required to appear at a specific row and column, then the recognition object looks for that text string at that position each time it detects a new screen in the data stream. Or, if the registered definition includes multiple attributes, of multiple types, then the recognition object does a comparison between each of the requirements of that definition and the contents of the screen in the data stream, every time a screen appears. This type of comparison is performed for each registered screen definition, each time a screen appears in the data stream, until either a registered screen is recognized (that is, a positive response to the test at Step 520), or until it is determined that this is not a registered screen. When a screen in the data stream matches one of the registered screens, control transfers from Step 520 to Step 530. Otherwise, if there is no match, control returns to Step 500 to await the occurrence of another screen in the data stream.

At Step 530, an asynchronous event notification is generated to the target object that was registered for the screen which was detected at Step 520. The manner of generating this event notification does not form part of the present invention. Facilities of the workstation operating system are used, according to processes that are known in the art.

At Step 540, the target object receives the asynchronous event notification, and executes the logic defined by the programmer of the target object. The event notification is received using operating system facilities according to processes known in the art, and does not form part of the present invention. As has been previously described, the logic executed by the target object is application-specific. In a multi-tasking operating system, the target object may execute its screen processing logic concurrently with the execution of the recognition object. FIG. 5 indicates this by showing a dotted line for the event notification (indicating that one part of the control flow leaves the monitoring routine shown), and also by showing that control returns to monitoring the data stream(s) at Step 500 (which is done by the recognition object, at the same time the target object is invoked). The asynchronous event notification in a multi-tasking environment, as specified by the present invention, enables this concurrent processing to occur.

The process of FIG. 5 is shown as an unending loop of monitoring for screens, and processing registered screens when they are detected. It will be obvious to one skilled in the art that this process continues only so long as the workstation application software is executing, even though no end has been depicted in FIG. 5. Further, FIG. 5 does not show a return of control from Step 540 back to any of the other steps of the figure. This indicates that the target object executes independently, and is invoked anew each time its associated screen is detected.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. In a computing environment, computer readable code for implementing an efficient and reliable technique for recognizing occurrence of a presentation space in a host data stream and asynchronously notifying a target routine, said computer readable code embodied on one or more computer-readable media and comprising:

a subprocess for creating a screen recognition object;

a subprocess for registering at least one recognition tuple with said recognition object, each of said tuples comprising a screen description and a corresponding target routine;

a subprocess for specifying at least one data stream to be monitored by said recognition object; and a subprocess for causing said recognition object to monitor said at least one data stream, further comprising:

a subprocess for detecting when an update has occurred, creating an updated presentation space;

a subprocess for comparing said updated presentation space to each of said screen descriptions in said registered tuples until detecting a match; and a subprocess for firing an asynchronous notification event to said corresponding target routine upon said match detection.

2. Computer readable code for implementing the technique according to claim 1, further comprising a subprocess for unregistering at least one of said recognition tuples with said recognition object.

3. Computer readable code for implementing the technique according to claim 1, wherein said target routine further comprises a subprocess for executing screen processing logic concurrently with said subprocess for monitoring.

4. Computer readable code for implementing the technique according to claim 1, wherein said screen description comprises one or more of: (1) one or more text string attributes; (2) one or more field attributes; (3) one or more extended field attributes; (4) one or more color attributes; (5) a cursor position attribute; and (6) one or more operator intervention condition attributes.

5. A system for implementing a fast and efficient technique for recognizing occurrence of a presentation space in a host data stream and asynchronously notifying a target routine, said system comprising:
 means for creating a screen recognition object;
 means for registering at least one recognition tuple with said recognition object, each of said tuples comprising a screen description and a corresponding target routine;
 means for specifying at least one data stream to be monitored by said recognition object; and
 means for causing said recognition object to monitor said at least one data stream, further comprising:
  means for detecting when an update has occurred, creating an updated presentation space;
  means for comparing said updated presentation space to each of said screen descriptions in said registered tuples until detecting a match; and
  means for firing an asynchronous notification event to said corresponding target routine upon said match detection.

6. The system for implementing the technique according to claim 5, further comprising means for unregistering at least one of said recognition tuples with said recognition object.

7. The system for implementing the technique according to claim 5, wherein said target routine further comprises means for executing screen processing logic concurrently with said means for monitoring.

8. The system for implementing the technique according to claim 5, wherein said screen description comprises one or more of: (1) one or more text string attributes; (2) one or more field attributes; (3) one or more extended field attributes; (4) one or more color attributes; (5) one or more cursor position attributes; and (6) one or more operator intervention condition attributes.

9. A method for implementing a fast and efficient technique for recognizing occurrence of a presentation space in a host data stream and asynchronously notifying a target routine, said method comprising the steps of:
 creating a screen recognition object;
 registering at least one recognition tuple with said recognition object, each of said tuples comprising a screen description and a corresponding target routine;
 specifying at least one data stream to be monitored by said recognition object; and
 causing said recognition object to monitor said at least one data stream, further comprising the steps of:
  detecting when an update has occurred, creating an updated presentation space;
  comparing said updated presentation space to each of said screen descriptions in said registered tuples until detecting a match; and
  firing an asynchronous notification event to said corresponding target routine upon said match detection.

10. The method for implementing the technique according to claim 9, further comprising the step of enabling unregistration of at least one of said recognition tuples with said recognition object.

11. The method for implementing the technique according to claim 9, wherein said target routine further comprises executing screen processing logic concurrently with said monitoring step.

12. The method for implementing the technique according to claim 9, wherein said screen description comprises one or more of: (1) one or more text string attributes; (2) one or more field attributes; (3) one or more extended field attributes; (4) one or more color attributes; (5) a cursor position attribute; and (6) one or more operator intervention condition attributes.

13. In a computing environment, computer readable code for efficiently and reliably recognizing occurrence of a presentation space in a host data stream and asynchronously notifying a target routine, said computer readable code embodied on one or more computer-readable media and comprising:
 a subprocess for creating a screen recognition object;
 a subprocess for registering at least one recognition tuple with said recognition object, each of said tuples comprising a screen description and a corresponding target routine, wherein said screen description comprises one or more of: (1) one or more text string attributes; (2) one or more field attributes; (3) one or more extended field attributes; (4) one or more color attributes; (5) one or more cursor position attributes; and (6) one or more operator intervention condition attributes;
 a subprocess for specifying at least one data stream to be monitored by said recognition object; and
 a subprocess for monitoring said at least one data stream by said recognition object, further comprising:
  a subprocess for detecting when an update has occurred, creating an updated presentation space;
  a subprocess for comparing said updated presentation space to each of said screen descriptions in said registered tuples until detecting a match; and
  a subprocess for firing an asynchronous notification event to said corresponding target routine upon said match detection.

14. A system for efficiently and reliably recognizing occurrence of a presentation space in a host data stream and asynchronously notifying a target routine, comprising:
 means for creating a screen recognition object;
 means for registering at least one recognition tuple with said recognition object, each of said tuples comprising a screen description and a corresponding target routine, wherein said screen description comprises one or more of: (1) one or more text string attributes; (2) one or more field attributes; (3) one or more extended field attributes; (4) one or more color attributes; (5) a cursor position attribute; and (6) one or more operator intervention condition attributes;
 means for specifying at least one data stream to be monitored by said recognition object; and
 means for monitoring, by said recognition object, said at least one data stream, further comprising:
  means for detecting when an update has occurred, creating an updated presentation space;
  means for comparing said updated presentation space to each of said screen descriptions in said registered tuples until detecting a match; and means for firing an asynchronous notification event to said corresponding target routine upon said match detection.

15. A method of efficiently and reliably recognizing occurrence of a presentation space in a host data stream and asynchronously notifying a target routine, comprising the steps of:

creating a screen recognition object;

registering at least one recognition tuple with said recognition object, each of said tuples comprising a screen description and a corresponding target routine, wherein said screen description comprises one or more of: (1) one or more text string attributes; (2) one or more field attributes; (3) one or more extended field attributes; (4) one or more color attributes; (5) a cursor position attribute; and (6) one or more operator intervention condition attributes;

specifying at least one data stream to be monitored by said recognition object; and monitoring, by said recognition object, said at least one data stream, further comprising the steps of:

detecting when an update has occurred, creating an updated presentation space;

comparing said updated presentation space to each of said screen descriptions in said registered tuples until detecting a match; and firing an asynchronous notification event to said corresponding target routine upon said match detection.

* * * * *